Feb. 6, 1940.   B. W. KIRKBY   2,189,114
FRUIT AND VEGETABLE DISPLAY DEVICE
Filed Aug. 6, 1938   4 Sheets-Sheet 1

Inventor
B. W. Kirkby

By Clarence A. O'Brien
and Hyman Berman
Attorneys

Feb. 6, 1940. B. W. KIRKBY 2,189,114
FRUIT AND VEGETABLE DISPLAY DEVICE
Filed Aug. 6, 1938 4 Sheets-Sheet 2
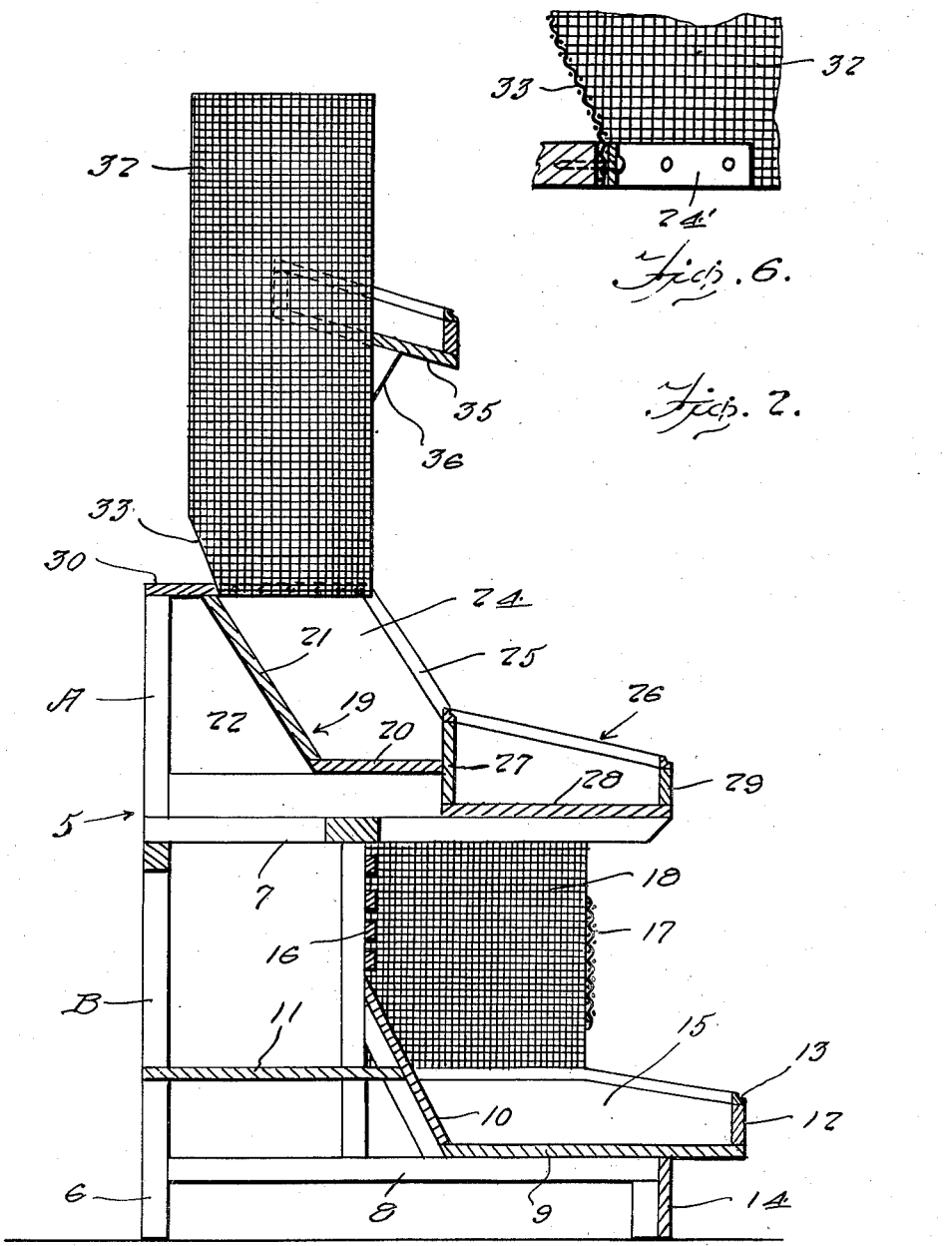
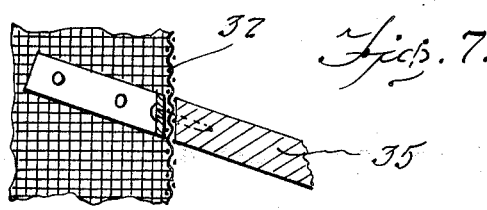
Inventor
B. W. Kirkby
By Clarence A. O'Brien
and Hyman Berman
Attorneys Feb. 6, 1940.   B. W. KIRKBY   2,189,114
FRUIT AND VEGETABLE DISPLAY DEVICE
Filed Aug. 6, 1938   4 Sheets-Sheet 3

Inventor
B. W. Kirkby
By Clarence A. O'Brien
and Hyman Berman,
Attorneys

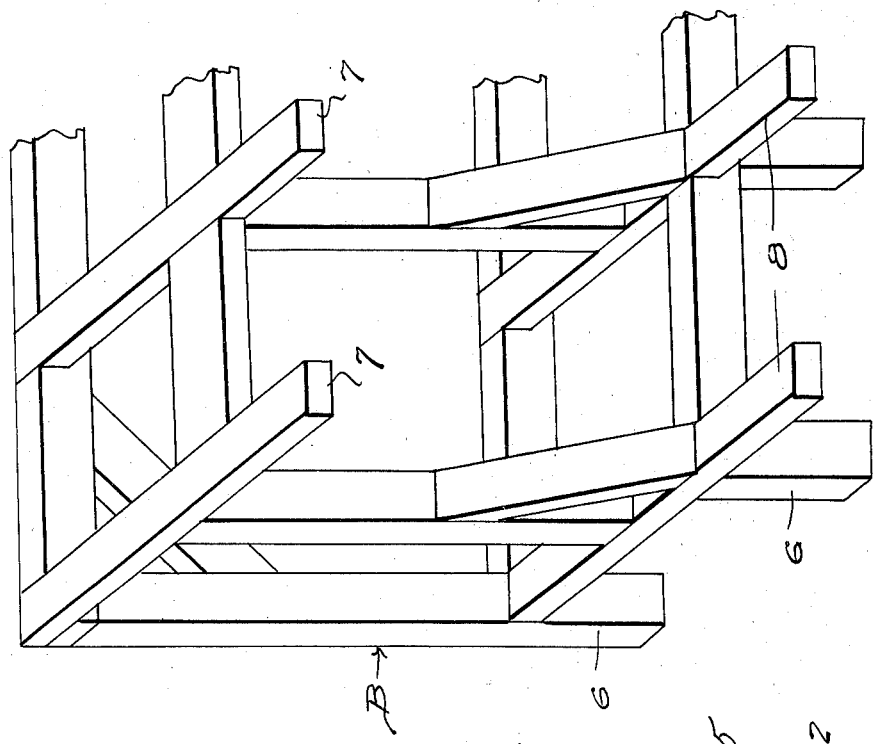
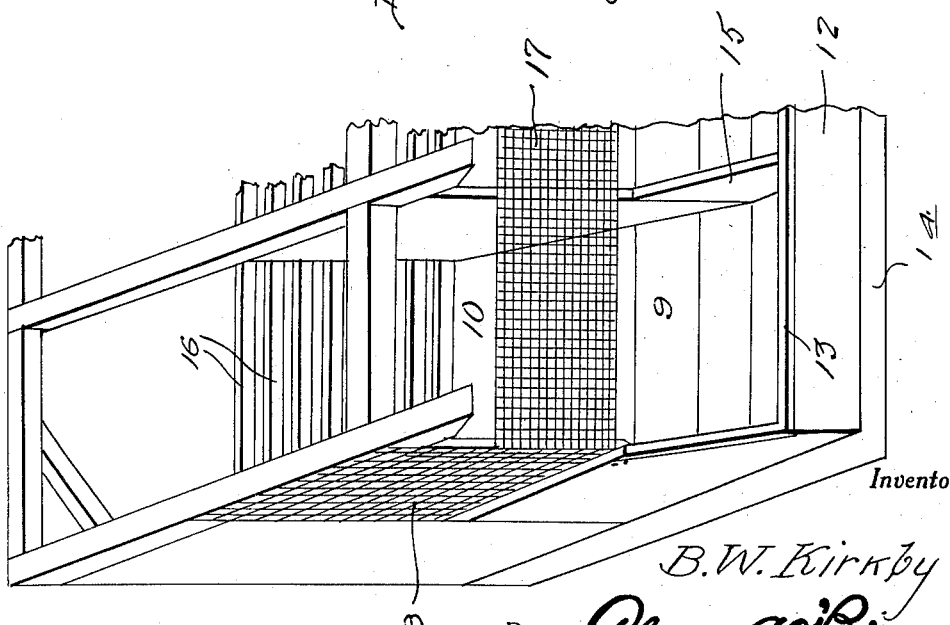

Patented Feb. 6, 1940

2,189,114

UNITED STATES PATENT OFFICE 2,189,114

FRUIT AND VEGETABLE DISPLAY DEVICE

Byron W. Kirkby, Brockville, Ontario, Canada

Application August 6, 1938, Serial No. 223,517

1 Claim. (Cl. 312—121)

This invention relates to fruit and vegetable display devices for stores and has for the primary object the provision of an efficient, durable and inexpensive device of this character which will attractively display a large quantity of fruit and vegetables within a limited space and will permit air to circulate between and about the fruit to prevent sweating and molding of the fruit, consequently keeping the fruit in a firm and fresh condition for a maximum length of time. Another object is to provide a device of the character specified constructed and arranged so that the fruit and vegetables may be easily obtained and sold, always presenting the fruit for sale which has been on display for the longest period of time and further provides space for the display of other foodstuffs and bottled beverages.

With these and other objects in view, the invention consists in certain novel features of construction, combination and arrangement of parts to be hereinafter more fully described and claimed.

For a complete understanding of my invention reference is to be had to the following description and accompanying drawings, in which—

Figure 2 is a transverse sectional view illustrating the device.

Figure 6 is a fragmentary vertical sectional view illustrating the securing of a hopper in place.

Figure 7 is a fragmentary vertical sectional view showing the securing of a hopper to the shelf.

Figure 8 is a fragmentary perspective view showing a portion of the lower unit.

Figure 9 is a fragmentary perspective view showing a portion of the frame of the lower unit.

Figure 1:
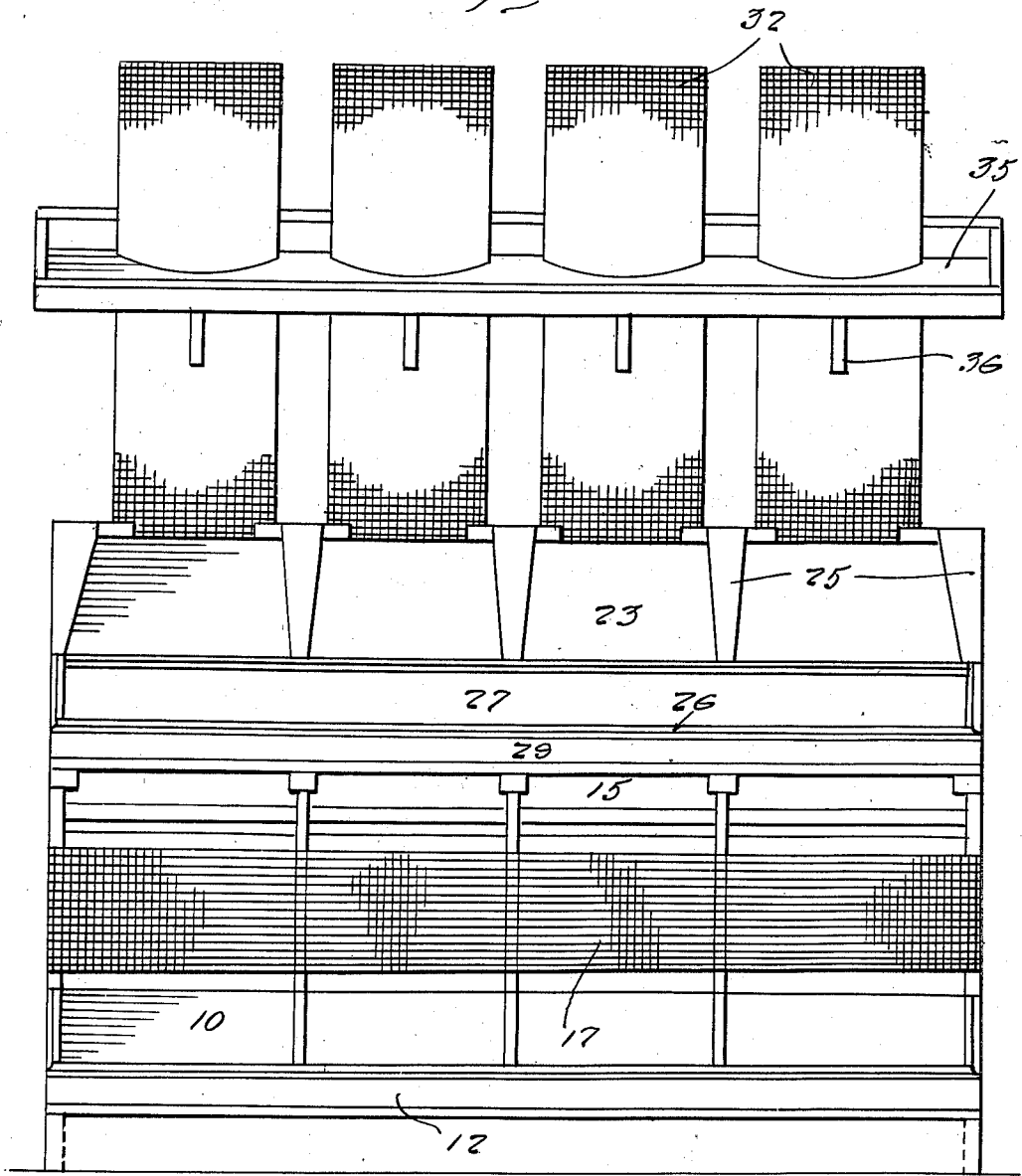
Figure 1 is a front elevation illustrating a display device constructed in accordance with my invention.
Figure 3:
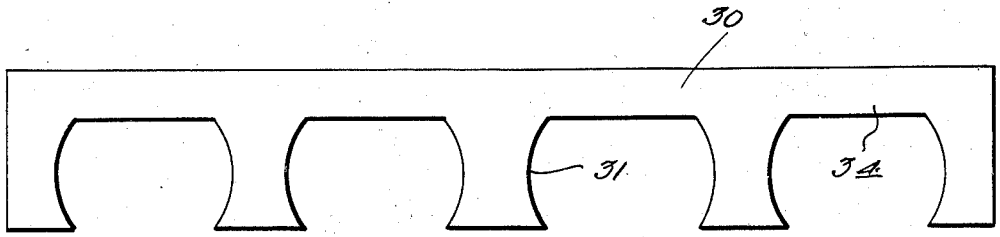
Figure 3 is a top plan view illustrating a plate or strip on which the hoppers are mounted.
Figure 4:
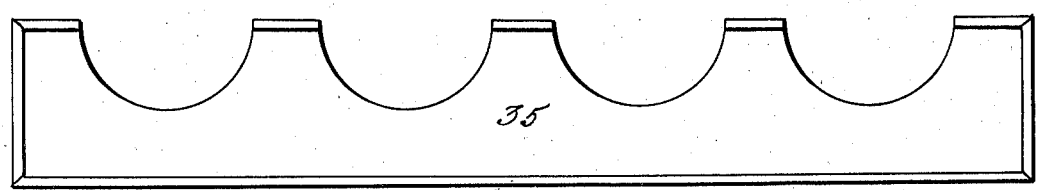
Figure 4 is a top plan view illustrating a shelf.
Figure 5:
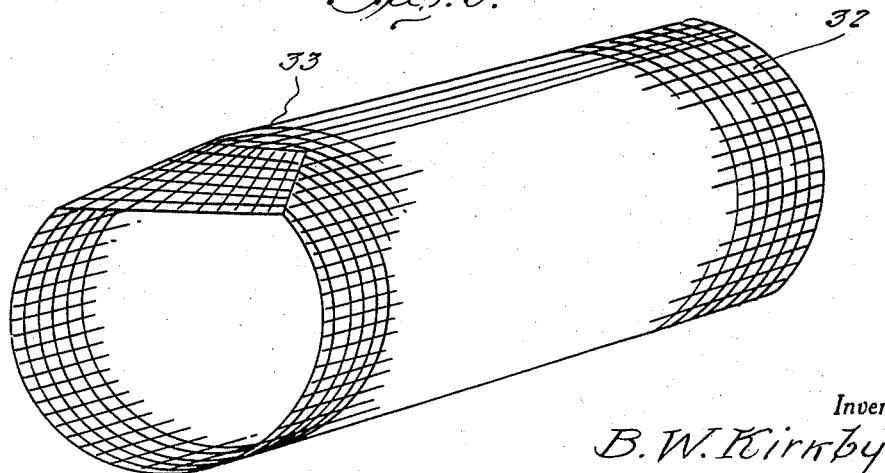
Figure 5 is a perspective view illustrating one of the hoppers.
Figure 10:
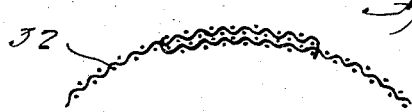
Figure 10 is a fragmentary transverse sectional view showing the overlap of the material of a hopper.

Referring in detail to the drawings, the numeral 5 indicates the display device in entirety and includes upper and lower units A and B, separable from each other so that they may be independently employed or when it is desired to have a maximum display, both units may be readily brought into use.

The lower unit consists of a frame construction of skeleton formation including supporting legs, the latter being indicated by the character 6. The skeleton frame further includes transversely arranged upper and lower sills 7 and 8. The lower sills have mounted thereon a floor 9 projecting a limited distance beyond the front legs and includes an upwardly and rearwardly inclined portion 10 extending a limited distance above a bottom wall 11. A front wall 12 is mounted on the floor 9 at the front edge thereof and is arranged to extend longitudinally of the unit B and is provided along its upper edge with a suitable molding strip 13. A facing plate or strip 14 is arranged between the floor 9 and the floor on which the device rests in front of the front legs 6 to prevent articles from rolling under the unit and also to give the unit a finished appearance. Spaced dividers 15 are mounted on the floor 9 between the front wall 12 and the upwardly and rearwardly inclined portion 10 of the floor 9 to provide bins to receive comparatively large vegetables and the like. Extending longitudinally of the unit B between the upper sills 7 and the upper end of the upwardly and rearwardly inclined portion of the floor is a plurality of spaced members 16. Foraminous material 17 is mounted in front of the unit B between the upper sills 7 and the bins and coacts with end foraminous strips 18 forming hoppers for the bins. The dividers 15 extend well up into the foraminous material 17 and 18 so as to provide individual hoppers for each bin. Vegetables may be readily placed within the hoppers and will fill the bins therefrom as the vegetables are removed from the bins. The vegetables while in the hoppers are exposed to a free circulation of air due to the use of the foraminous material.

The upper sills 7 may be covered by a top wall (not shown) so that when the unit B is in use by itself it will have a finished appearance and the top wall may be employed for the display of other foodstuffs thereon.

The unit A consists of a skeleton frame on which is mounted flooring 19 including a horizontally arranged portion 20 and an upwardly and rearwardly inclined portion 21. End walls 22 are provided for the skeleton frame and coact with dividers 24ª and the flooring 19 in forming bins 24 having entrances indicated by the character 23 in Figure 1. The dividers 24 have trim strips 25 secured thereon and taper towards their lower ends to give a finished appearance.

An elongated bin 26 is arranged in front of the bins 24 and the rear wall 27 thereof forms the front wall of the bins 24. The bottom wall 28 of the bin 26 is disposed in a plane slightly below the wall 19 of the bins 24. The front wall 29 is of a less height than the rear wall 27 so as to readily expose the contents of the bin 26. Large size vegetables are accommodated in the bin 26.

The skeleton frame of the unit A caries a top plate 30 having a series of notches 31 which align with the bins 24 and have secured therein the lower ends of vertically arranged cylindrical hoppers 32 constructed of foraminous material. The lower ends of the hoppers discharge into the bins 24. The foraminous material which forms the hoppers is secured in the notches 31 by suitable fasteners passing through bands 24' arranged interiorly of the hoppers and entering the strips 30. Each hopper 32 is constructed from a single length of foraminous material which material is arranged to overlap for the purpose of strengthening the construction of the hopper. The lower portions of the hoppers have flattened portions 33 providing inclined walls which act to direct the contents of the hoppers into the bins 24. The notches 31 have straight walls 34 to match the flattened portions of the hoppers 32. The upper ends of the hoppers are fully open to permit fruit to be readily placed in said hoppers. The hoppers being constructed of foraminous material will permit air to circulate freely therethrough for the purpose of keeping the fruit from sweating and molding, consequently allowing the fruit to be kept for a much longer period of time and further permitting the fruit to be easily viewed.

A shelf 35 is provided with notches to receive the hoppers and is provided with a desired inclination and has upstanding marginal walls. A series of braces 36 are carried by the shelf and bear against the hoppers for supporting the shelf on the hoppers. The foraminous material of the hoppers is secured to the walls of the notches of the shelf, which, with the braces 36, prevents displacement of the shelf and permits fruit to be displayed thereon.

It is to be understood that the material used in the construction of the units A and B may be of any desired kind while it is preferable that the hoppers be constructed of wire mesh so that the contents of the hoppers can be easily viewed and to permit air to readily reach the contents. The hoppers 32 may be readily filled with fruit from the upper ends thereof which fruit feeds downwardly into the bins 24 and as the fruit is sold or removed from the bins the hoppers replenish said bins and in this way the fruit which has been on display for the longest time is sold first.

The units when used together, as shown in Figures 1 and 2, provide a very efficient display device for fruit and vegetables and other foodstuff and will only occupy a minimum amount of floor space and arranges the fruit and vegetables so that they are readily accessible to the purchaser for inspection and permits the seller to readily remove the fruit as sold, consequently saving time in the handling and selling of the fruit and allows the seller to have on display a large amount of fruit within a very limited space. Further, it is to be understood that the unit A can be easily employed by itself and may be arranged on a counter for the display and sale of fruit. Also the unit B can be employed by itself for the display and sale of vegetables, preferably of the dry and large type.

It is believed that the foregoing description when taken in connection with the drawings will fully set forth the construction and advantages of this invention to those skilled in the art to which such a device relates, so that further detailed description will not be required.

What I claim is:

A display device comprising a supporting structure, walls arranged in said structure and coacting with each other to form bins having upwardly and rearwardly inclined walls and horizontally disposed walls and divider walls, a top plate carried by the supporting structure and having notches aligning with the bins, cylindrical foraminous material secured in said notches and rising therefrom to form vertically arranged hoppers to receive and display fruit and discharge said fruit into the hoppers as fruit is removed from the latter and to permit air to circulate freely in contact with the fruit, a shelf construction having a series of notches receiving the bins with the foraminous material thereof secured to walls of the notches, said shelf being disposed at an inclination, and braces carried by the shelf and bearing against the hoppers.

BYRON W. KIRKBY.